UNITED STATES PATENT OFFICE 2,575,009

DICHLORO DIETHER ESTERS

Marian F. Fegley, Mont Clare, and Willard J. Croxall, Bryn Athyn, Pa., assignors to Rohm & Haas Company, Philadelphia, Pa., a corporation of Delaware No Drawing. Application August 19, 1949, Serial No. 111,333

8 Claims. (Cl. 260—473)

This invention deals with dichloro diether esters of the formula

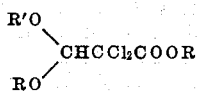

and with a method for their preparation. In this formula R represents an alkyl group of not over four carbon atoms and R' represents an aliphatic or an aryl group. This invention also concerns a method for the preparation of these compounds.

These compounds are prepared by reacting an alcohol or a phenol, R'OH, with an alkyl trichloroalkoxypropionate, a compound of the formula

preferably between 20° C. and 110° C. Higher temperatures may, however, be used. The reaction may be effected by mixing the two materials and taking off hydrogen chloride. Heating may be desirable to initiate and/or to complete the reaction. The reaction may be effected in the presence of an inert organic solvent, if desired.

It is sometimes helpful to have present an inorganic material which absorbs hydrogen chloride, such as calcium carbonate, or sodium bicarbonate. When the reaction is run under reduced pressure, hydrogen chloride may be taken off as a gas or when a volatile organic solvent is used, it may be swept out with vapors of the solvent.

The above starting materials, alkyl trichloroalkoxypropionates, are obtained by a series of reactions which may be traced back to acetylene and alkyl carbonates. Thus, the alkyl trichloroalkoxypropionates are obtained by chlorinating alkyl β-alkoxy-α-chloroacrylates, which are in turn obtained from alkyl β-alkoxyacrylates. These last are available through the reaction of acetylene and alkyl carbonates in the presence of anhydrous strongly basic alkaline catalysts.

This last reaction is fully described in application Serial No. 52,607, filed by Croxall and Schneider on October 2, 1948, now Patent No. 2,535,012. Dialkyl carbonates (RO)$_2$CO, such as methyl, ethyl, propyl, or butyl carbonates, or the like, are reacted at 20° to 110° C. with acetylene in the presence of alkaline catalysts, such as alkali metal acetylides, alkali metal alcoholates, or quaternary ammonium alkoxides. Typical examples of catalysts are sodium acetylide, potassium acetylide, sodium methylate, potassium ethylate, sodium butoxide, benzyl trimethyl ammonium methoxide, ethoxide or tert.-butoxide.

By this reaction, there are formed alkyl β-alkoxyacrylates, alkyl β,β-dialkoxyproprionates, dialkyl dialkoxysuccinates, and dialkyl alkoxymaleates. These various compounds can be separated by distillation when so desired, or more conveniently the first two esters are collected in one fraction and the latter two in another. A fraction which contains both alkyl β-alkoxyacrylate and alkyl dialkoxypropionate may be taken and the dialkoxypropionate converted to alkoxyacrylate. It is, of course, feasible to fractionate alkoxyacrylate and dialkoxypropionate and to convert the latter to alkoxyacrylate.

This reaction in either case is accomplished by heating a mixture containing dialkoxypropionate or an alkyl dialkoxypropionate itself in the presence of a dealcoholating catalyst and taking off a mole of alcohol per mole of dialkoxypropionate. This process is described in application Serial No. 52,608, filed by Croxall and Schneider on October 2, 1948, now Patent No. 2,571,212.

Reaction of the alkyl β-alkoxyacrylates with chlorine is readily carried out at —5° C. to 20° C. to form an addition product, alkyl α,β-dichloro-β-alkoxypropionate, which is dehydrohalogenated by heating at 120° to 250° C., whereby an alkyl α-chloro-β-alkoxyacrylate is formed. The full details of this reaction are presented in our application Serial No. 111,331, filed on even date, now U. S. Patent 2,526,007, issued October 17, 1950.

When these products are treated with one mole of chlorine per mole, they are converted into the starting materials for the present invention. This reaction is more fully described in our application Serial No. 111,332, filed on even date, now U. S. Patent 2,526,008, issued October 17, 1950.

Examples will now be given to illustrate each of the above procedural steps leading to the alkyl α,α-dichloro-β,β-dietherpropionates of this invention.

A. PREPARATION OF DIETHER PROPIONATES AND ETHER ACRYLATES

Example 1

In an apparatus having a gas-tight, stainless-steel stirrer, there was placed 225 grams of anhydrous ethyl alcohol. Small cubes of sodium were gradually added thereto in an amount of 30 grams. The sodium was dissolved with the formation of sodium ethylate. Excess alcohol was distilled off under reduced pressure. To the sodium ethylate there was added 2200 grams of diethyl carbonate. The reaction vessel was then equipped with gas inlet and outlet tubes, manometer, and thermometer. It was flushed with nitrogen and heated to 80° C. Acetylene was passed in until the rate of absorption became very slow. The vessel and contents were cooled and the flow of acetylene discontinued. Dilute acetic acid was added to destroy the catalyst. Two layers formed. The upper oily layer was separated and fractionally distilled.

A forerun taken at atmospheric pressure consisted of ethyl alcohol and ethyl carbonate. Distillation was continued under reduced pressure. A fraction distilling at 65°–75° C./2–4 mm. consisted of 10% of ethyl β-ethoxyacrylate and 90% of ethyl β,β-diethoxypropionate. At 75° C./4 mm. a fraction of pure ethyl β,β-diethoxypropionate was obtained. Between 75° C./4 mm. and 114° C./3 mm., a mixture of ethyl β,β-diethoxypropionate and diethyl α,α-diethoxysuccinate was taken off. At 114°–115° C./3–4 mm., there was obtained a fraction consisting of diethyl α,α-diethoxysuccinate. On further distillation, a fraction containing this ether succinate and diethyl α-ethoxymaleate was obtained.

In the same way other esters of carbonic acid and monohydric alcohols may be reacted with acetylene to give ether acrylates and propionates as above. Other alkaline catalysts may be used in place of sodium ethylate in amounts from 0.01% to 5% of the weight of the carbonate. Typical esters thus available are methyl β-methoxyacrylate, methyl β,β-dimethoxypropionate, propyl β-propoxyacrylate, propyl β,β-dipropoxyprionate, isopropyl β-isopropoxyacrylate, butyl β-butoxyacrylate, butyl β,β-dibutoxypropionate, isobutyl β-isobutoxyacrylate, etc.

B. CONVERSION OF ALKYL β,β-DIALKOXYPROPIONATES to ALKYL β-ALKOXYACRYLATES

Example 2

A mixture of 192 grams of ethyl β,β-diethoxypropionate and one gram of sodium acid sulfate was placed in a reaction vessel equipped with a short packed column and slowly heated. At about 80° C., there began to be evolved vapors of ethyl alcohol. Heating was continued with distillation of the alcohol. Pot temperatures advanced to 150° C. with overhead temperatures of 78.5° C. to 80° C. A total of 44.5 grams of ethyl alcohol was taken off. Heating was continued and at 85.5°–86.5° C./19 mm., a main fraction was taken which was ethyl β-ethoxyacrylate.

Example 3

In accordance with the method of Example 2, a mixture of 96 grams of n-butyl β,β-di(n-butoxy)propionate and 0.25 gram of sodium acid sulfate was heated. At batch temperatures of 110°–160° C., there was evolved n-butanol with overhead temperatures of 110° to 114° C. The batch temperature was carried to 180° C. At 110°–111° C./3 mm., there was obtained the main fraction which consisted of butyl β-butoxyacrylate.

Example 4

The above procedure was applied to a charge of 954 grams of methyl β,β-dimethoxypropionate and 0.1 gram of sodium acid sulfate. There were obtained 185 grams of methanol and 650 grams of methyl β-methoxyacrylate.

The dealcoholating catalysts include both strongly acidic and basic materials, such as potassium acid sulfate, p-toluene sulfonic acid, sulfuric acid, boric acid, zinc chloride, sulfonated cation exchange resins in their hydrogen form, alkali metal alcoholates, alkaline earth alcoholates, etc., amounts of 0.01% to 1% by weight generally sufficient.

C. PREPARATION OF ALKYL α-CHLORO-β-ALKOXYACRYLATES

Example 5

There were mixed in a reaction vessel equipped with stirrer, reflux condenser, and gas inlet tube 216 parts by weight of ethyl β-ethoxyacrylate and 200 parts of chloroform. This mixture was cooled by use of a salted ice bath. Chlorine gas was bubbled through the mixture while it was kept below 10° C. When an excess of chlorine had been added as shown by development of a yellow color, the passage of chlorine was discontinued. Excess chlorine and part of the chloroform were removed under reduced pressure while the reaction mixture was gently warmed. The product was ethyl α,β-dichloro-β-ethoxypropionate in chloroform solution.

A mixture of 178.5 parts of ethyl β-ethoxyacrylate and 250 parts of chloroform was reacted with chlorine as above. Excess chlorine and chloroform were taken off by heating. Hydrogen chloride was evolved and the material in the reaction vessel was heated to 150°–160° C. for two hours. It was then fractionally distilled. A forerun of a small amount of ethyl β-ethoxyacrylate was obtained at 95°–150° C./61 mm. At 150°–155° C./61 mm., there was distilled ethyl α-chloro-β-ethoxyacrylate. It has a refractive index, $n_D^{20}$, of 1.4728. By analysis the product obtained contained 20.11% of chlorine. The theoretical chlorine content for ethyl α-chloro-β-ethoxyacrylate is 19.85%. The yield was 92%.

Example 6

Ethyl α,β-dichloro-β-ethoxypropionate was prepared as in Example 5 above. It was run very slowly into a mixture of 1.35 gram moles of triethylamine in 400 ml. of ethyl ether until 1.28 gram moles of the ether ester had been added. Triethylamine hydrochloride was formed and was separated by filtration. The ether was distilled off and the resulting material filtered to remove additional triethylamine hydrochloride which had separated. It was then distilled at 78°–80° C./1 mm. to give a 78% yield of ethyl α-chloro-β-ethoxyacrylate.

Example 7

A solution of 116 parts by weight of methyl β-methoxyacrylate in 250 parts of chloroform was cooled to 10° C. and treated with chlorine gas as in Example 5. The temperature of the reaction mixture was kept between 2° and 10° C. by use of an ice-salt bath. As soon as a yellow color developed, excess chlorine was taken off along with most of the chloroform by stripping under reduced pressure. The product thus obtained was methyl α,β-dichloro-β-methoxypropionate.

A portion of this product was heated at 170° C. for 1.5 hours. Hydrogen chloride was taken off as it was evolved. The heated product was then fractionally distilled. A forerun of methyl β-methoxyacrylate was taken off at 95°–124° C./28 mm. At 124°–128° C./28 mm., a fraction was distilled which corresponded in composition to that of methyl α-chloro-β-methoxyacrylate. The redistilled product boiled at 124°–125° C./28 mm. and had a refractive index, $n_D^{20}$, of 1.4838.

Example 8

(a) A mixture of 31.5 parts of butyl β-butoxyacrylate in 75 parts of chloroform was cooled to 5° C. and chlorine passed therethrough while the temperature was kept between 0° and 8° C. by means of an ice-salt bath. The chloroform was distilled from the reaction mixture and the resulting material heated at 160°–180° C. for an hour. It was then distilled at low pressure. After a forerun of butyl β-butoxyacrylate, there was obtained a fraction of 18 parts which distilled at 135°–146° C./4 mm. and corresponded in composition to butyl α-chloro-β-butoxyacrylate.

(b) A mixture of 89 parts of ethyl α-chloro-β-ethoxyacrylate, 112 parts of normal butyl alcohol, and 2 parts of p-toluene sulfonic acid was heated in a reaction vessel equipped with a packed distilling column topped with partial take-off head. Ethanol was distilled from the reaction mixture. When it was no longer obtained, the temperature was raised and butanol was taken off. The mixture was then subjected to fractional distillation at reduced pressure. A forerun of eight parts distilling at 90°–122° C./4 mm. consisted of mixed ethyl α-chloro-β-ethoxyacrylate and butyl α-chloro-β-butoxyacrylate. At 122°–145° C./4 mm., there was obtained butyl α-chloro-β-butoxyacrylate in an amount of 65 parts. This material was redistilled at 142°–144° C./4 mm. to give a very pure product, which had a refractive index of 1.4674 and which contained by analysis 14.75% of chlorine (theory 14.76%).

This last example also illustrates the fact that ether acrylates can be both transetherified and transesterified. By use of a mild dealcoholating catalyst, such as sodium acid sulfate, a smaller ether group may be replaced with a larger one without changing the ester group. Thus, ethyl β-ethoxyacrylate is heated with butyl alcohol to give ethyl β-butoxyacrylate or with octyl alcohol to give ethyl β-octoxyacrylate. This interchange reaction is particularly useful to introduce other than an alkoxy group in the β-position, such as benzoxy or cyclohexoxy. It provides a method for varying the term R, which need not, therefore, be identical in both the ether group and the ester group. When such compounds are carried through the various steps herein described, there can be obtained compounds of the formula

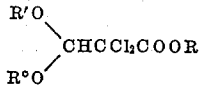

in which the R groups are all different.

D. PREPARATION OF ALKYL α,α,β-TRICHLORO-β-ALKOXYPROPIONATES

Example 9

A solution of 50 parts by weight of methyl α-chloro-β-methoxyacrylate in 200 parts of chloroform was placed in a three-necked flask equipped with stirrer, reflux condenser, and gas inlet tube. The solution was stirred and cooled by means of an external ice-salt bath to about 5° C. Chlorine was bubbled into the solution while the temperature was maintained between 0° and 10° C. An excess of chlorine was indicated when the reaction mixture began to develop a yellow color. The excess chlorine and the chloroform were stripped off and the reaction mixture was fractionally distilled. At 64° to 67° C./2 mm., there was obtained a fraction which corresponded in composition to methyl α,α,β-trichloro-β-methoxypropionate in a yield of 83%. On redistillation this product had a refractive index, $n_D^{20}$, of 1.4701.

Example 10

A solution of 100 parts by weight of ethyl α-chloro-β-ethoxyacrylate in 250 parts by weight of chloroform was reacted with chlorine by the steps described in Example 9. At 90°–97° C./1 mm., there was collected a fraction which contained the ethyl α,α,β-trichloro-β-ethoxypropionate. This was redistilled at 95°–97° C./1 mm. The redistilled product had a refractive index, $n_D^{20}$, of 1.4618. It contained by analysis 42.48% or chlorine. The theory for $C_7H_{11}O_3Cl_3$ is 42.7%. The yield was 93%.

Example 11

In the same way butyl α-chloro-β-butoxyacrylate was chlorinated. The fraction collected at 130°–139° C./1 mm., corresponded in composition to butyl α,α,β-trichloro-β-butoxypropionate. The product as obtained contained 35.5% of chlorine.

The trichloro ether esters of the formula ROCHClCCl$_2$COOR react with an alcohol or a phenol to give the compounds of this invention. Suitable alcohols include any of the saturated monohydric aliphatic alchols, such as methyl, ethyl, propyl, isopropyl, butyl, isobutyl, sec.-butyl, tert.-butyl, amyl, including tert.-amyl, hexyl, heptyl, octyl, 2-ethylhexyl, isononyl, 3,5,5,-trimethylhexyl, dodecyl, etc. Unsaturated alcohols, such as allyl, methallyl, crotyl, or undecenyl, may also be used. Cycle-containing alcohols, such as cyclohexyl, methylcyclohexyl, benzyl, butylbenzyl, phenoxyethyl, and so on are likewise effective. Furthermore, other monhydric alcohols, such as terpineol, nordihydrodicyclopentenyl, tetrahydrofurfuryl, cinnamyl, etc., may be used.

Phenols act in the same way, phenol, cresol, xylenol, chlorophenol, 2,4-dichlorophenol, pentachlorophenol, bromophenol, methoxyphenol, acetylphenol, cycloexylphenol, phenylphenol, butylphenols, octylphenols, p-nitrophenol, and the like being reactive with the trichloro esters to give β,β-diether α,α-dichloropropionates. While phenols, R'OH, in which R' is an aromatic group of the benzene series are of particular interest, the phenols are not confined to monocyclic phenols. Naphthols also react with alkyl α,α,β-trichloro-β-alkoxypropionates to give products corresponding to those obtained from phenols of the benzene series.

E. REACTION OF ALKYL α,α,β-TRICHLORO-β-ALKOXYPROPIONATES AND MONOHYDRIC ALCOHOLS OR PHENOLS

Example 12

(a) A solution of 18 parts by weight of ethyl α,α,β-trichloro-β-ethoxypropionate in 40 parts of anhydrous ethanol was treated with two drops of concentrated hydrochloric acid and heated on a steam bath under reflux for eight hours. Ethanol was then distilled off in an amount of 33 parts at overhead temperatures of 77° to 80° C. A fraction of seven parts was taken at 20° C./17 mm. to 85° C./2 mm. A fraction was then distilled at 85°–92° C./2 mm. It was identified as ethyl α,α-dichloro-β,β-diethoxypropionate. It had a refractive index, $n_D^{20}$, of 1.4488 and a density, $d_4^{20}$, of 1.189. The distillate was found by analysis to contain 27.59% of chlorine. The theoretical chlorine content of the compound, $C_9H_{16}O_4Cl_2$, is 27.60%.

(b) The procedure of Example 12 (a) above was followed except that no hydrochloric acid was added to the reaction mixture. The fraction obtained at 87°–92° C./2 mm. was identified as ethyl α,α-dichloro-β,β-diethoxypropionate. The fraction as obtained had a refractive index of 1.4450.

*Example 13*

A solution of 22 parts by weight of methyl α,α,β-trichloro-β-methoxypropionate in 50 parts of dry methanol was heated under reflux for eight hours. There was then distilled 45 parts of methanol at 66° C. Distillation was continued under reduced pressure. At 62°–66° C./4 mm., there was obtained a fraction of 12 parts which corresponded in composition to that of methyl α,α-dichloro-β,β-dimethoxypropionate.

*Example 14*

A mixture of 20 parts of butyl α,α,β-trichloro-β-butoxypropionate in 50 parts of butanol was heated at reflux temperatures for four hours. Butanol was then distilled from the reaction mixture and distillation was continued under reduced pressure. The fraction obtained at 134°–139° C./2 mm. corresponded in composition to that of butyl α,α-dichloro-β,β-dibutoxypropionate.

*Example 15*

The procedure of the previous example was followed with a solution of 27 parts of 2-ethylhexyl α,α,β-trichloro-β-2-ethylhexoxypropionate in 50 parts of 2-ethylhexyl alcohol. The product was obtained as a fraction distilling at 157°–161° C./0.8–1.2 mm. It was 2-ethylhexyl α,α-dichloro-β,β-di(2-ethylhexoxy)propionate.

*Example 16*

A mixture of 20 parts of ethyl α,α,β-trichloro-β-ethoxypropionate and 50 parts of tert.-butanol was refluxed for 12 hours under a slightly reduced pressure from a water pump. The temperature of the reaction mixture was about 80° C. Hydrogen chloride was taken off. Finally, the reaction mixture was heated to distill off the excess tert.-butanol and the reaction mixture was fractionated. The main fraction was obtained at 87° C./1 mm. It corresponded in composition to ethyl α,α-dichloro-β-tert.-butoxy-β-ethoxypropionate. It has a refractive index $n_D^{20}$ of 1.4600.

*Example 17*

A mixture of 55 parts by weight of methyl α,α,β-trichloro-β-methoxypropionate and 25 parts by weight of phenol was heated on a water bath to about 60° C. under normal pressure. The pressure was then reduced with a water pump to about 200 mm. The hydrogen chloride which was evolved was thus taken off. The temperature of the batch was carried to about 90° C. Unreacted phenol was taken off and a fraction of methyl α,α,β-trichloro-β-methoxypropionate obtained at 88°–92° C./13 mm. A fraction distilled at 100° to 109° C./3 mm. corresponded in composition to methyl α,α-dichloro-β-methoxy-β-phenoxypropionate.

*Example 18*

(a) A mixture of 80 parts of ethyl α,α,β-trichloro-β-ethoxypropionate and 32 parts of phenol was heated at 40 to 60° C. for an hour. It was then held at about 60° C. while the pressure in the reaction vessel was reduced to about 70 mm. Hydrogen chloride was taken off. The mixture was then heated under reduced pressure and fractionally distilled. A forerun of 18 parts of phenol was taken off. There was then obtained at 70°–137° C./4 mm. ethyl α,α,β-trichloro-β-ethoxypropionate. At 137°–145° C./4 mm., a fraction of 76 parts of ethyl α,α-dichloro-β-ethoxy-β-phenoxypropionate was obtained. The fraction contained by analysis 23.55% of chlorine (theory 23.1%). This was redistilled at 120°–121° C./1 mm. The redistilled material had a refractive index, $n_D^{20}$, of 1.5037, and a density of 1.239, and a molecular refraction of 73.37 (theory 73.30).

(b) A reaction vessel was charged with 80 parts by weight of ethyl α,α,β-trichloro-β-ethoxypropionate and 32 parts of phenol. This mixture was heated under atmospheric pressure at reflux temperatures of 150°–200° C. for 4.5 hours. Hydrogen chloride was taken off by aid of a water pump. The reaction mixture was fractionally distilled. Unreacted phenol was removed and at 70°–137° C./4 mm. unreacted ethyl α,α,β-trichloro-β-ethoxypropionate was obtained. At 137°–145° C./4 mm., there was distilled a fraction containing ethyl α,α-dichloro-β-ethoxy-β-phenoxypropionate, amounting to 25 parts. At 143°–150° C./4 mm., 46 parts of this product was obtained. The refractive index $n_D^{20}$, of a center cut was 1.5050.

*Example 19*

A mixture of 62 parts of butyl α,α,β-trichloro-β-butoxypropionate and 18 parts of phenol was heated on a steam bath, first at atmospheric pressure and then under reduced pressure from a water pump. Hydrogen chloride was evolved and carried away. The reaction mixture was then fractionally distilled. After phenol had been taken off, a small fraction of butyl α,α,β-trichloro-β-butoxypropionate was obtained at 130°–142° C./2 mm. At 163°–171° C./2 mm., there was obtained a fraction which corresponded in composition to butyl α,α-dichloro-β-butoxy-β-phenoxypropionate.

*Example 20*

A mixture of 40 parts of ethyl α,α,β-trichloro-β-ethoxy propionate and 27 parts of 2,4-dichlorophenol was heated up to 100° C. for an hour at atmospheric pressure. The mixture was then subjected to reduced pressure from a water pump while the temperature was held at 90° to 100° C. The reaction mixture was then fractionally distilled. Unreacted starting materials were taken off between 70° and 170° C./5 mm. At 171°–172° C./5 mm., there was taken off a fraction of 29.5 parts which was identified as ethyl α,α-dichloro-β-ethoxy-β-(2,4-dichlorophenoxy)propionate. It had a refractive index, $n_D^{20}$, of 1.5221, a molecular refraction of 84.33 (theory 83.04), and a density of 1.360. By analysis the fraction contained 37.35% of chlorine. The theoretical value for the compound is 37.71%.

*Example 21*

A mixture of 50 parts of ethyl α,α,β-trichloro-β-ethoxypropionate and 22 parts of o-cresol was heated on a steam bath for an hour at normal pressure and for three hours under reduced pressure from a water pump. The reaction mixture was then fractionally distilled. The fraction taken at 136°–146° C./2 mm. corresponded in composition to ethyl α,α-dichloro-β-ethoxy-β-o-methylphenoxypropionate.

In the same way as shown above other monohydric phenols may be used with one or more ring substituents. The reaction is apparently a general one for any compound having a phenolic or alcoholic hydroxyl group.

Example 22

A mixture of 50 parts of ethyl α,α,β-trichloro-β-ethoxypropionate and 15 parts of allyl alcohol was heated under reflux on a water bath under atmospheric pressure. The pressure in the reaction vessel was reduced with a water pump. Hydrogen chloride and allyl alcohol were taken off. The reaction mixture was fractionally distilled. The fraction taken off at 95°–105° C./2–3 mm. contained the desired product, ethyl α,α-dichloro-β-ethoxy-β-alloxypropionate.

In place of allyl alcohol shown above, there may be used other unsaturated alcohols, including methallyl, crotyl, undecenyl, and the like.

Example 23

There were mixed 50 parts by weight of ethyl α,α,β-trichloro-β-ethoxypropionate and 53 parts of oleyl alcohol. The mixture was heated on a steam bath for three hours at normal pressure and then for three hours at 15–20 mm. pressure. Hydrogen chloride was evolved and taken off. The product was taken up in a little benzene, activated charcoal was added to the solution, and the solution was heated on the steam bath. The solution was then filtered and the filtrate heated under reduced pressure. After the solvent had been removed, the material was heated to 125° C./1 mm. to strip off volatile material. There remained a straw-colored liquid which corresponds in composition to ethyl α,α-dichloro-β-ethoxy-β-octadecenoxypropionate.

Example 24

The steps of Example 23 were followed with a mixture of 25 parts of ethyl α,α,β-trichloro-β-ethoxypropionate and 37 parts of dodecyl alcohol. Stripping of the final product was accomplished at about 110° C. at 2 mm. The product was obtained as a colorless oil. It consisted chiefly of the desired product, ethyl α,α-dichloro-β-ethoxy-β-dodecoxypropionate.

Example 25

(a) A mixture of 50 parts of ethyl α,α,β-trichloro-β-ethoxypropionate and 30 parts of tert.-butylphenol was heated for an hour at 90°–95° C. under normal pressure and then for three hours under reduced pressure from a water pump. During this time hydrogen chloride was taken off. The material was taken up in a little petroleum ether and washed with a 5% sodium hydroxide solution. The petroleum ether solution was separated and dried over a calcium sulfate drying agent. It was then heated and freed of solvent. Heating was carried to 125° C./1–2 mm. There remained a residue which corresponded to ethyl α,α-dichloro-β-ethoxy-β-butylphenoxypropionate.

(b) The above procedure was applied to a mixture of 22 parts of methyl α,α,β-trichloro-β-methoxypropionate and 20 parts of p-α,α,γ,γ-tetramethylbutylphenol. The residue corresponds to methyl α,α-dichloro-β-methoxy-β-octylphenoxypropionate.

Example 26

A mixture of 25 parts of ethyl α,α,β-trichloro-β-ethoxypropionate and 14 parts of nitrophenol was heated on the steam bath for an hour at normal pressure and then for two hours under reduced pressure from a water pump. Hydrogen chloride was taken off during this time. The product was then taken up in toluene, charcoal was added, the mixture warmed, and the solution filtered. The filtrate was stripped of solvent to a temperature of 110° C./1 mm. There remained a light yellow oil which corresponded in composition to ethyl α,α-dichloro-β-ethoxy-β-nitrophenoxypropionate, having a nitrogen content of 4.09%.

Example 27

The procedure of Example 25 was followed with a mixture of 50 parts of ethyl α,α,β-trichloro-β-ethoxypropionate and 53 parts of pentachlorophenol. Stripping was carried to 110° C./1 mm. The residue corresponded in composition closely to that for ethyl α,α-dichloro-β-ethoxy-β-pentachlorophenoxypropionate, containing 53.5% of chlorine.

Exactly the same reaction is obtained when methyl, propyl, or butyl esters of the trichloroalkoxypropionic acids are used in place of the ethyl compound, which has been shown for purposes of illustration and not limitation.

Finally, it may be noted that the reaction described and illustrated above is generally applicable to alcohols and phenols. The alcohol need not be purely aliphatic, for arylaliphatic and cycloaliphatic groups are quite as useful and as effective as ethyl, allyl, butyl, octyl, and the like aliphatic hydrocarbon groups. Thus, methyl α,α,β-trichloro-β-methoxypropionate heated with a molecular equivalent of benzyl alcohol yields methyl α,α-dichloro-β-benzoxy-β-methoxypropionate, and ethyl α,α,β-trichloro-β-ethoxy-propionate and cyclohexanol yield ethyl α,α-dichloro-β-cyclohexoxy-β-ethoxypropionate. Furthermore, it is found that a β-chlorine is replaced with a heterocyclic oxy group, as is readily shown by heating together an alkyl trichloroalkoxypropionate and tetrahydrofurfuryl alcohol. Hydrogen chloride is evolved and the tetrahydrofurfuroxy group introduced in place of a chlorine atom.

The diether esters of this invention are compatible with various types of resinous materials, serving as softeners and plasticizers therefor. Some of the compounds have insecticidal properties. For example, the methyl, ethyl, propyl and butyl esters of α,α-dichloro-β-alkoxy-β-(2,4-dichlorophenoxy)propionate are effective miticides. Ethyl α,α-dichloro-β-ethoxy-β-(methoxyphenoxy)propionate also has insecticidal properties. The compounds furthermore serve as chemical intermediates, having a plurality of reactive groups and positions.

We claim:

1. A process for preparing compounds of the formula

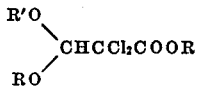

which comprises reacting together a monohydroxy compound, R'OH, and an ester of the formula ROCHClCCl₂COOR and splitting out HCl, R being an alkyl group of not over four carbon atoms and R' being the non-hydroxylated residue of a member of the class consisting of monohydric aliphatic alcohols in which the residue is a hydrocarbon group, and monohydric phenols.

2. A process for preparing compounds of the formula

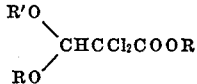

which comprises reacting together a monohydric aliphatic alcohol, R'OH, and an ester of the formula ROCHClCCl₂COOR and splitting out HCl, R being an alkyl group of not over four carbon atoms and R' being an aliphatic hydrocarbon group.

3. A process for preparing compounds of the structure $$\begin{array}{c}R'\\\diagdown\\RO\diagup\end{array}CHCCl_2COOR$$

which comprises reacting together a phenol, R'OH, and an ester of the formula

ROCHClCCl₂COOR and splitting out HCl, R being an alkyl group of not over four carbon atoms and R' being the residue of a monohydric phenol.

4. A process for preparing ethyl a,a-dichloro-β,β-diethoxypropionate which comprises reacting by heating together ethanol and ethyl a,a,β-trichloro-β-ethoxypropionate.

5. A process for preparing methyl a,a-dichloro-β,β-dimethoxypropionate which comprises reacting by heating together methanol and methyl a,a,β-trichloro-β-methoxypropionate.

6. A process for preparing butyl a,a-dichloro-β,β-dibutoxypropionate which comprises reacting by heating together butanol and butyl a,a,β-trichloro-β-butoxypropionate.

7. A process for preparing methyl a,a-dichloro-β-methoxy-β-phenoxypropionate which comprises reacting by heating together phenol and methyl a,a,β-trichloro-β-methoxypropionate.

8. A process for preparing ethyl a,a-dichloro-β-ethoxy-β-phenoxypropionate which comprises reacting by heating together phenol and ethyl a,a,β-trichloro-β-ethoxypropionate.

MARIAN F. FEGLEY.
WILLARD J. CROXALL.

REFERENCES CITED

The following references are of record in the file of this patent:

UNITED STATES PATENTS

| Number | Name | Date |
|---|---|---|
| 2,459,059 | Babson | Jan. 11, 1949 |
| 2,474,715 | Babson | June 28, 1949 |